(12) United States Patent
Schieli et al.

(10) Patent No.: US 7,467,760 B2
(45) Date of Patent: Dec. 23, 2008

(54) COIL ARRANGEMENT FOR RADIO-FREQUENCY IDENTIFICATION DEVICES, PROCESS AND APPARATUS FOR MAKING SAID ARRANGEMENT

(75) Inventors: Nicolas Schieli, Montréal (CA); Christian Bussiére, Val-des-Lacs (CA)

(73) Assignee: Allflex Europe SAS, Vitre (FR)

( * ) Notice: Subject to any disclaimer, the term of this patent is extended or adjusted under 35 U.S.C. 154(b) by 457 days.

(21) Appl. No.: 10/512,845

(22) PCT Filed: Apr. 29, 2003

(86) PCT No.: PCT/CA03/00626

§ 371 (c)(1),
(2), (4) Date: Jun. 21, 2005

(87) PCT Pub. No.: WO03/094106

PCT Pub. Date: Nov. 13, 2003

(65) Prior Publication Data

US 2005/0248429 A1    Nov. 10, 2005

Related U.S. Application Data

(60) Provisional application No. 60/407,950, filed on Sep. 5, 2002.

(30) Foreign Application Priority Data

Apr. 29, 2002   (CA) .................................. 2384207

(51) Int. Cl.
*B21F 3/04* (2006.01)
(52) U.S. Cl. .................................... 242/437
(58) Field of Classification Search ............... 242/437, 242/437.2; 29/600, 602.1; 336/180, 225
See application file for complete search history.

(56) References Cited

U.S. PATENT DOCUMENTS

| | | | |
|---|---|---|---|
| 3,895,423 A | | 7/1975 | Arakelov et al. |
| 4,999,742 A | | 3/1991 | Stampfli |
| 5,084,699 A | | 1/1992 | DeMichele |
| 5,347,263 A | | 9/1994 | Carroll et al. |
| 5,531,390 A | | 7/1996 | Gustafson |
| 5,606,488 A | | 2/1997 | Gustafson |
| 5,625,370 A | | 4/1997 | D'Hont |
| 5,680,044 A | * | 10/1997 | McDougall et al. ......... 324/303 |
| 5,914,862 A | | 6/1999 | Ferguson et al. |
| 6,014,071 A | * | 1/2000 | Onishi et al. ................ 336/170 |
| 6,075,707 A | | 6/2000 | Ferguson et al. |
| 6,144,280 A | | 11/2000 | Amada et al. |
| 6,147,655 A | | 11/2000 | Roesner |

(Continued)

FOREIGN PATENT DOCUMENTS

DE            43 37 921         5/1995

(Continued)

*Primary Examiner*—Emmanuel M Marcelo
(74) *Attorney, Agent, or Firm*—Venable LLP; Robert Kinberg; Kyle D. Petaja

(57) ABSTRACT

A coil arrangement for radio-frequency identification devices, process and an apparatus for making such a coil arrangement are described herein. The coil arrangement includes first and second terminals having a geometry different from one another and from the active coil winding of the arrangement. The apparatus is in the form of a spindle having three axially adjacent portions defining cross-sectional profiles.

51 Claims, 17 Drawing Sheets

U.S. PATENT DOCUMENTS

| | | |
|---|---|---|
| 6,192,574 B1 | 2/2001 | Wargren |
| 6,357,690 B1 | 3/2002 | McEwen |
| 2001/0010117 A1 | 8/2001 | Gustafson |
| 2001/0020896 A1 | 9/2001 | Higuchi |
| 2001/0046126 A1 | 11/2001 | Colello |

FOREIGN PATENT DOCUMENTS

| | | |
|---|---|---|
| DE | 197 33 348 | 9/1998 |
| EP | 0 130 902 | 1/1985 |
| EP | 0 526 484 | 2/1993 |
| EP | 0 657 903 | 6/1995 |
| EP | 0 677 210 | 10/1995 |
| EP | 0 743 615 | 11/1996 |
| EP | 0 845 792 | 6/1998 |
| EP | 1 132 861 | 9/2001 |
| EP | 1 178 432 | 2/2002 |
| WO | WO 91/00603 | 1/1991 |
| WO | WO 93/09551 | 5/1993 |
| WO | WO 97/42598 | 11/1997 |
| WO | WO 98/21730 | 5/1998 |

* cited by examiner

FIG_1

FIG_4

FIG_7

FIG_10

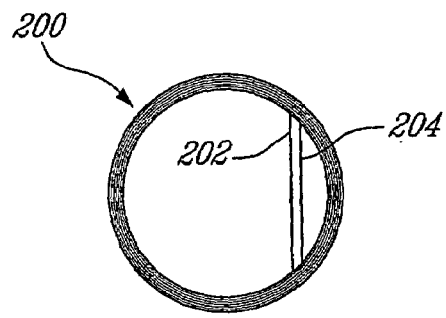
FIG._15
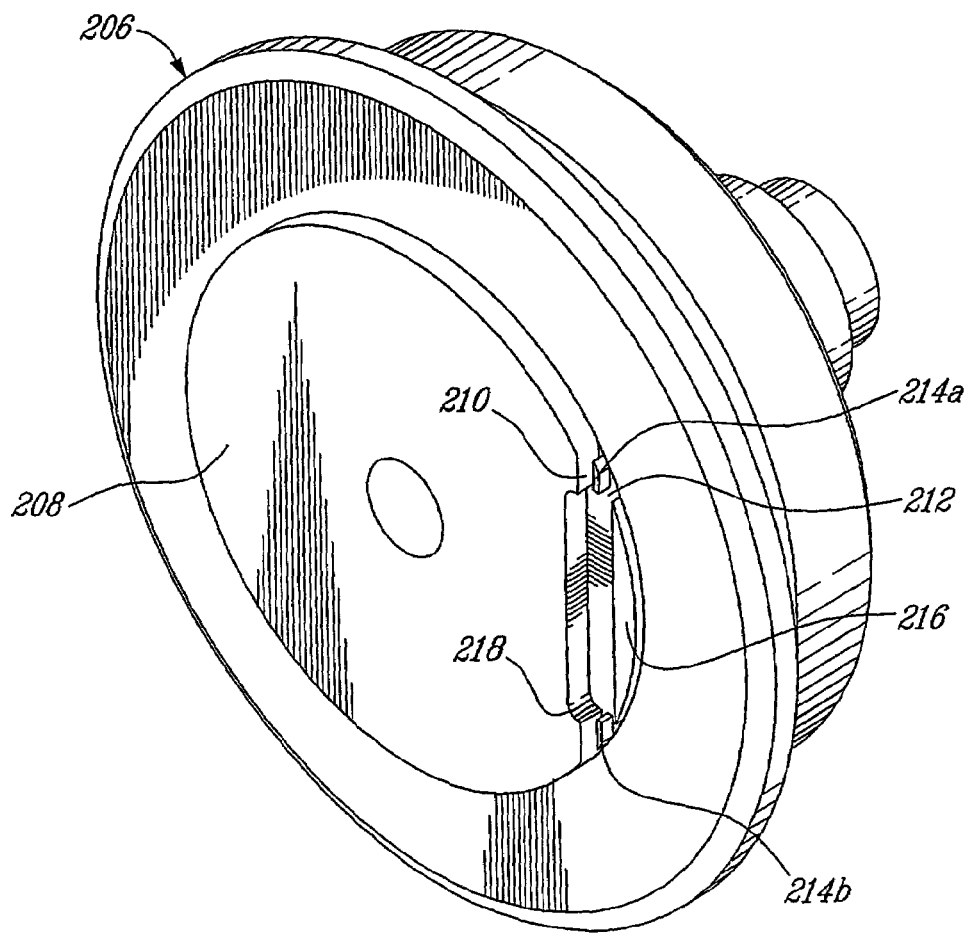
FIG._16

COIL ARRANGEMENT FOR RADIO-FREQUENCY IDENTIFICATION DEVICES, PROCESS AND APPARATUS FOR MAKING SAID ARRANGEMENT

FIELD OF THE INVENTION

The present invention relates to radio-frequency identification devices. More specifically, the present invention is concerned with a coil arrangement therefore and with a process and an apparatus for making such a coil arrangement.

BACKGROUND OF THE INVENTION

Radio-frequency identification (RFID) technology is well known in the art. RFID systems are usually made of two components, a reader and a tag or card, which will hereinafter be referred to as an RFID device. The RFID device generally comprises an antenna, in the form of an air coil, and a microchip to which the antenna is connected. Since the operation of a RFID system is believed well known in the art, it will therefore not be discussed further herein.

The manufacturing of miniaturized RFID devices is generally divided in two sequential steps: the winding of an ultra-fine magnet wire to provide an air-coil and the subsequent electrical connection of the two terminals of the coil to pads of the microchip.

One of the difficulties in the mass-production process of RFID devices concerns the handling of the coil terminals and their precise alignment above the microchip pads. Indeed, since the wire used to form the air coil is ultra-fine, usually wire gage AWG 44 to AWG 50, it is difficult to handle and to properly align and maintain during the soldering operation. Accordingly, a complicated dedicated apparatus is often used to connect the antenna to the microchip. This apparatus increases the total cost of production of the RFID device.

OBJECTS OF THE INVENTION

An object of the present invention is therefore to provide an improved coil arrangement for radio-frequency identification devices and process and apparatus for making same.

SUMMARY OF THE INVENTION

The present invention provides a coil geometry, a winding method and a winding apparatus that avoid the need to seize and align the coil terminal during the coil to circuit assembly step described hereinabove. The present invention also aims to increase the hardiness of the wire arrangement allowing a very low amount of turns for a coil. Which is particularly useful for coils operating at higher frequencies (13.56 MHz and above) as is sometimes the case in RFID systems.

More specifically, in accordance with the present invention, there is provided a coil arrangement for a radio-frequency identification device made of a wire; the coil arrangement comprising:

a first coil terminal made of one turn of the wire; the first coil terminal having a first coil terminal geometry;

a active coil made of a predetermined number of turns of the wire; the active coil defining a geometry of the coil arrangement;

a second coil terminal made of one turn of the wire; the second coil terminal having a second coil terminal geometry; and wherein the coil arrangement geometry, the first coil geometry and the second coil geometry are different.

According to another aspect of the present invention, there is provided a process for making a coil arrangement for a radio-frequency identification device from a wire; the method comprising:

making a first coil terminal by winding one turn of the wire; the first coil terminal having a first coil terminal geometry;

making an active coil by winding a predetermined number of turns of the wire; the active coil defining a coil arrangement geometry;

making a second coil terminal by winding one turn of the wire; the second coil terminal having a second coil terminal geometry; and making a supporting outer layer by winding at least one turn of the wire;

wherein the coil arrangement geometry, the first coil geometry and the second coil geometry are different.

According to third aspect of the present invention, there is provided a process for making a coil arrangement for a radio-frequency identification device from a wire; the method comprising:

providing a mandrel having a rotation axis, a first portion having a predetermined cross-sectional profile, a second portion having a predetermined cross-sectional profile and positioned axially adjacent to the first portion and a third portion having a predetermined cross-sectional profile and positioned axially adjacent to the second portion;

making a first coil terminal by winding one turn of the wire onto the second portion of the mandrel;

making an active coil by winding a predetermined number of turns of the wire onto the first portion of the mandrel; and making a second coil terminal by winding one turn of the wire onto the third portion of the mandrel.

According to another aspect of the present invention, there is provided a spindle for making a coil arrangement comprising:

a flange rotatable about a rotation axis; the flange having a flat face and a mandrel of a predetermined height; the mandrel generally defining a geometry of the coil arrangement via a peripheral coil winding surface; the mandrel having a first slot and a second slot separated by an intermediate wall having a height smaller than the height of the mandrel; the mandrel being also provided with an external wall having a height smaller than the height of the intermediate wall;

a counter-flange rotatable about the rotation axis; the counter-flange having a flat face and a recess configured and sized to receive at least a portion of the mandrel;

one of the flange and the counter-flange being so configured as to be axially movable along the rotation axis to modify the portion of the predetermined height of the mandrel received in the counter-flange, thereby selectively allow a wire forming the coil to enter either the first and second slots.

According to another aspect of the present invention, there is provided a spindle for making a coil arrangement comprising:

a flange rotatable about a rotation axis; the flange having a flat face and a mandrel; the mandrel generally defining a geometry of the coil arrangement via a peripheral coil winding surface; the mandrel having:

a central portion having a predetermined height;

a first semi-circular wall portion separated from the first semi-circular wall portion by a first slot; the first semi-circular wall portion having a height smaller than the predetermined height;

a second semi-circular wall portion opposite the first semi-circular wall portion; the second semi-circular wall portion being separated from the central portion by a second slot and having a height smaller than the predetermined height; the first and second slots being generally parallel;

a counter-flange rotatable about the rotation axis; the counter-flange having a flat face and a recess configured and sized to receive at least a portion of the mandrel;

one of the flange and the counter-flange being so configured as to be axially movable along the rotation axis to modify the portion of the predetermined height of the mandrel received in the counter-flange, thereby selectively allow a wire forming the coil to enter either the first and second slots.

According to a final aspect of the present invention, there is provided a spindle for making a coil arrangement, the spindle comprising:

a flange rotatable about a rotation axis; the flange having a predetermined thickness; the flange having a first cross-sectional profile for a first portion of the predetermined thickness, a second cross-sectional profile for a second portion of the predetermined thickness and a third cross-sectional profile for a third portion of the predetermined thickness;

a counter-flange rotatable about the rotation axis; the counter-flange having a flat face and a recess configured and sized to receive at least a portion of the mandrel;

one of the flange and the counter-flange being so configured as to be movable along the rotation axis to expose either the first, the first and second; and the first, second and third portions of the mandrel.

Generally stated, the present invention provides a coil geometry, a winding method and a winding apparatus that avoid the need to seize and align the coil terminal during the coil to circuit assembly step described hereinabove. The present invention also aims to increase the hardiness of the wire arrangement allowing a very low amount of turns for a coil, Which is particularly useful for coils operating at higher frequencies (13.56 MHz and above) as is sometimes the case in RFID systems.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 15 is a front view of a coil arrangement according to a second embodiment of the present invention;

FIG. 16 is a front view of a flange used to obtain the coil arrangement of FIG. 15;

DETAILED DESCRIPTION

Figure 1:
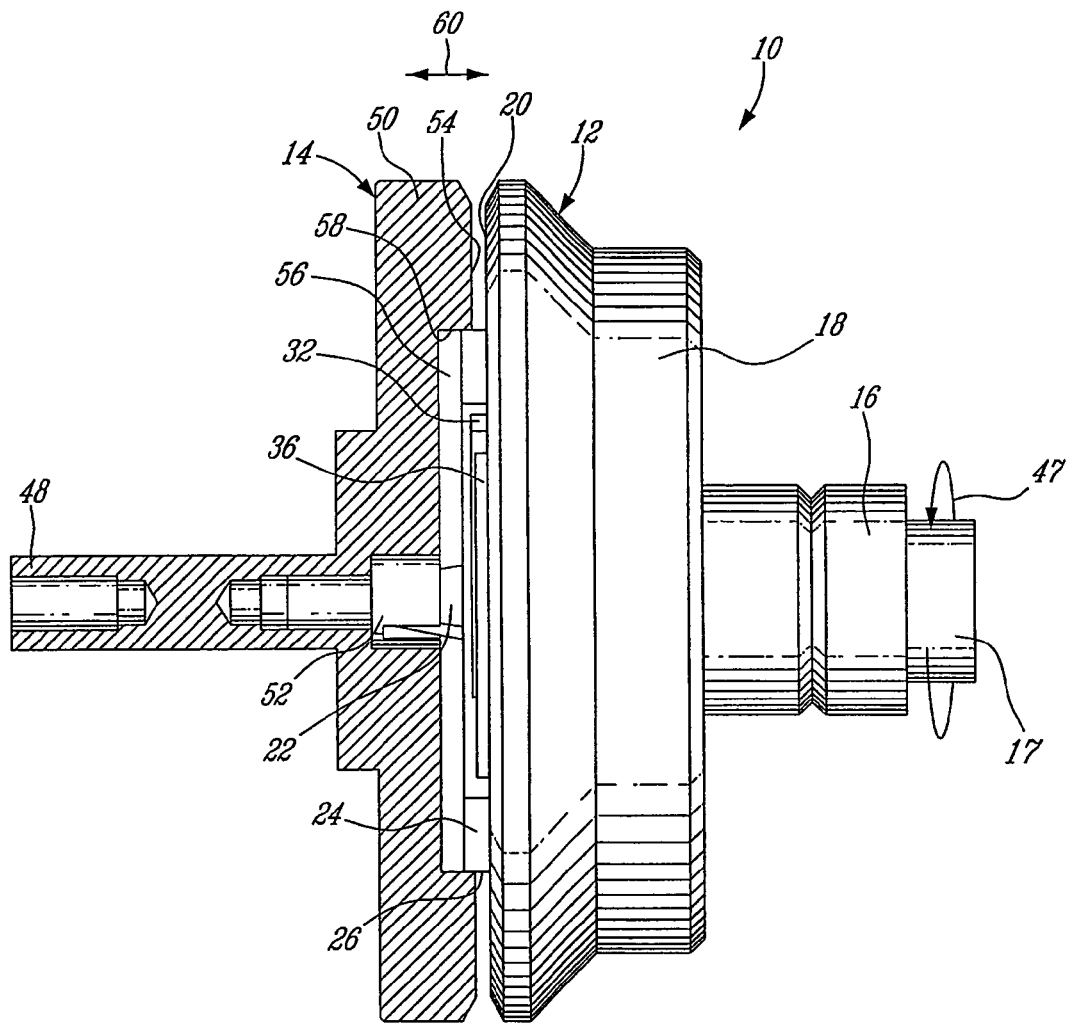
FIG. 1 is a side partly sectional view of a spindle according to an embodiment of the present invention; the flange and counter-flange of the spindle being shown in one of their coil winding position.
Figure 2:
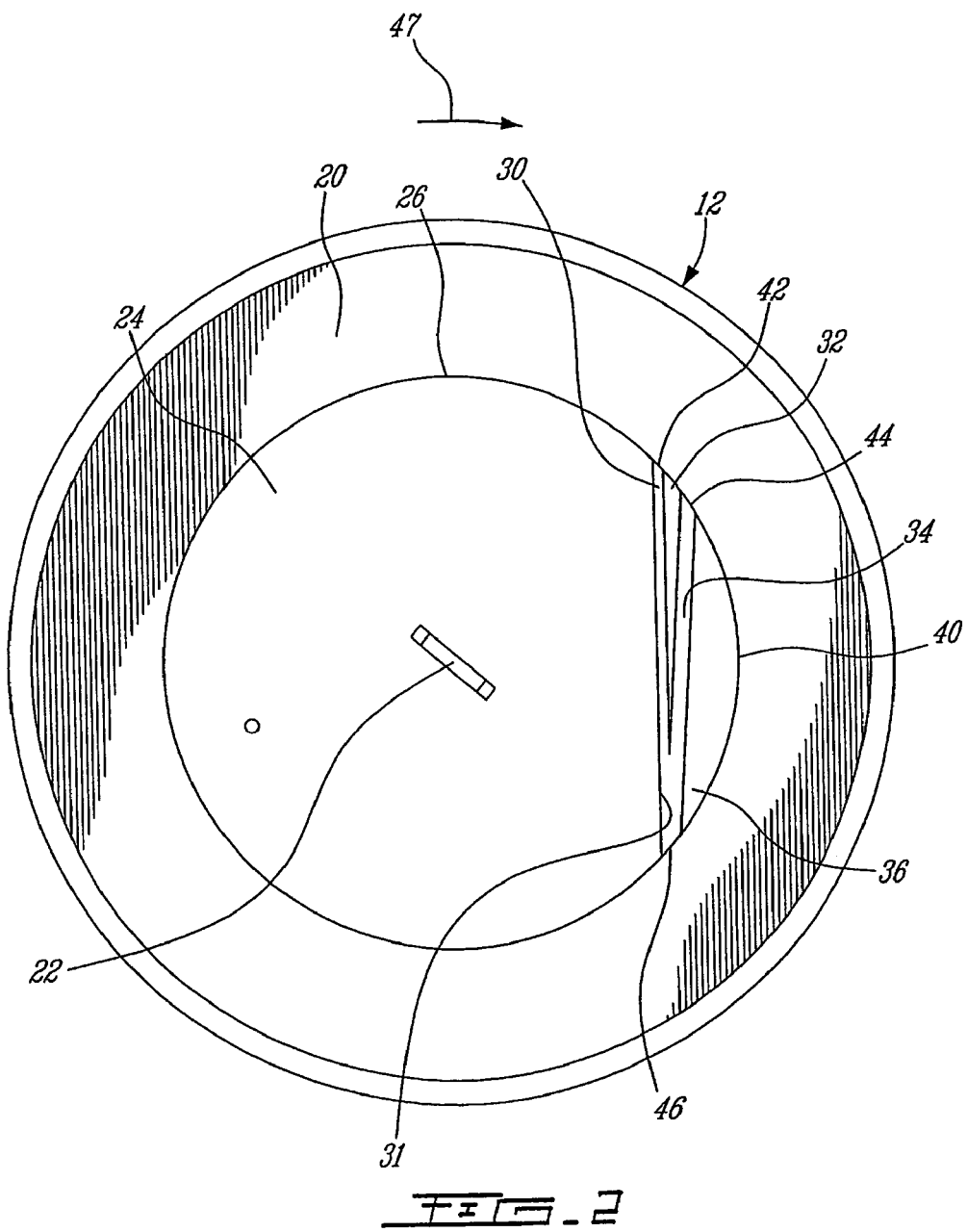
FIG. 2 is a front view of a flange of the winding spindle of FIG. 1.

Turning to FIGS. 1 and 2 of the appended drawings, a apparatus for forming a coil (herein after referred to as the spindle 10) will be described.

The spindle 10 includes a flange 12 and a counter-flange 14 shown in sectional view in the appended drawings.

The flange 12 includes a shaft 16, a body 18, a face 20 and a mandrel 24. As can be better seen from FIG. 2, the center of the mandrel 24 includes a clutch fork male portion 22. The circular mandrel 24 defines a generally cylindrical coil winding surface 26 having a predetermined height.

It is to be noted that the mandrel 24 is associated with a retractable portion 17 of the shaft 16 to thereby allow the disengagement of a finished coil from the mandrel 24, as will be described hereinbelow.

The mandrel 24 includes a first slot 30 defined by a wall 31 and an intermediate wall portion 32. It is to be noted that the height of the intermediate wall 32 is less than the height of the mandrel 24 (see FIG. 1). The mandrel 24 also includes a second slot 34 defined by the intermediate wall 32 and an external wall portion 36. The wall portion 36 has a semi-cylindrical outer surface 40 defining a portion of the coil winding surface 26 of the mandrel 24. It is to be noted that the height of the external wall 36 is less than the height of the intermediate wall 32.

In other words, the mandrel 24 is divided in three portions defining different cross-sectional profiles and hence, the geometry of the coil arrangement as will be described hereinbelow.

A first portion of the height of the mandrel, extending from the face 20 of the flange to the top of the external wall 36, has a generally circular cross-sectional profile.

A second portion of the height of the mandrel 24, extending between the top of the external wall 36 and the top of the intermediate wall 32, defines a generally inverted D-shaped cross-sectional profile.

Finally, a third portion of the height of the mandrel, extending between the top of the intermediate wall 32 and the top of the mandrel 24, defines a smaller inverted D-shaped cross-sectional profile.

As is clearly seen from FIG. 2, the slots 30 and 34 are each provided with a respective wire outlet 42 and 44 and with a common wire inlet 46.

Conventionally, the flange includes grooves (not shown) used to hold the end of the wire before it is would. Since this technique is believed well known in the art, it will not be discussed herein.

The shaft 16 of the flange 12 is associated with a motor (not shown) that may be precisely controlled to rotate the flange 12 in the direction of arrow 47.

The counter-flange 14 includes a shaft 48, a body 50 and a clutch fork female portion 52 configured to be engaged by the clutch fork male portion 22 of the flange 12 so as to cooperate therewith. The face 54 of the counter-flange 14 includes a circular recess 56 defining a cylindrical wall 58 having a diameter that is only slightly larger than the diameter of the mandrel 24. As will be further discussed hereinbelow, the shaft 48 is free-wheeling, i.e. that it may rotate about an axis common to the rotation axis of the shaft 16 of the flange 12. Furthermore, the shaft 48 is so associated with a displacement mechanism (not shown) that the counter-flange 14 may axially be moved (see double-arrow 60) to expose the first portion, the first and second portion or the first, second and third portion of the height of the mandrel.

Figure 3:
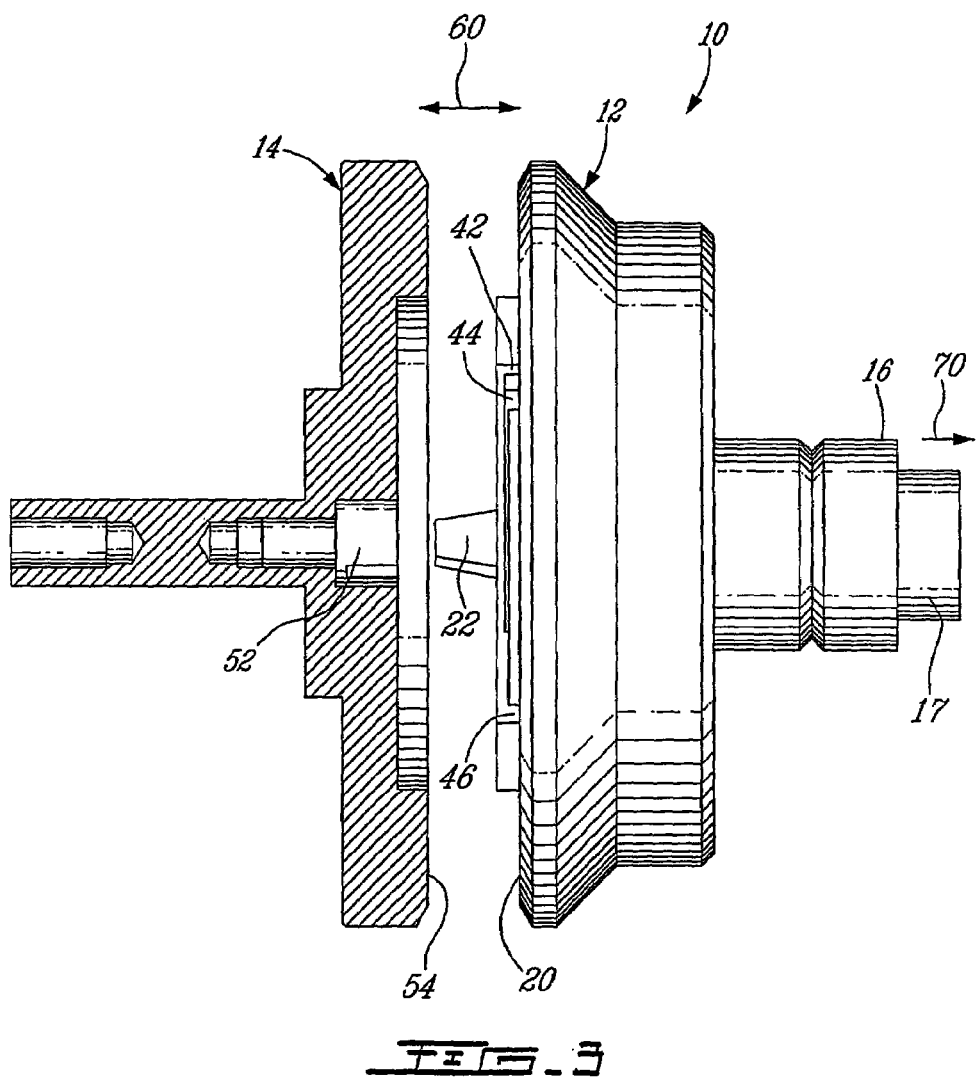
FIG. 3 is a side partly sectional view similar to FIG. 1 where the flange and counter flange are in a spaced apart position.

FIG. 3, which is very similar to FIG. 1, shows the counter-flange 14 in an opened position, where the clutch fork portions 22 and 52 are disengaged.

Figure 14:
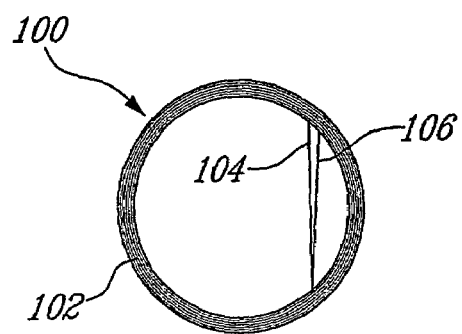
FIG. 14 is a front view of a coil arrangement according to a first embodiment of the present invention.

The flange 12 of the spindle 10 is so configured as to produce coils such as coil arrangement 100, as illustrated in FIG. 14. The coil arrangement 100 includes a plurality of turn of wire forming the main winding 102 thereof and defining a geometry of the coil arrangement 100, in this case a circle. The coil 100 also includes one turn of wire forming a first coil terminal 104 and defining a first coil terminal geometry, in this case an inverted D-shape having a straight portion and a curved portion. One turn of wire forms a second coil terminal 106 having a second coil terminal geometry, in this case a smaller inverted D-shape having a straight portion and a curved portion. The first and second coil terminals 102 and 104 defining an angle so that their straight portions converge. As will be discussed hereinbelow, a supporting inner layer of winding and a supporting outer layer of winding are also provided.

Turning now to FIGS. 4 to 13 of the appended drawings, the steps of the formation of a coil arrangement such as 100 from a single wire will be described.

The main steps are:

Formation of the supporting inner wire layer;
Formation of the first coil terminal;
Formation of the active coil;
Formation of the second coil terminal; and
Formation of the supporting outer layer.

As will be understood by one skilled in the art, before the winding of the coil arrangement, the end of the wire used must be secured to the spindle 10 according to conventional manner.

It is also to be noted that a wire guide (not shown) is used to guide the wire during the winding operation. This wire guide is operated in translation along the rotational axis of the spindle 10 providing a precise placement of the wire during winding. Since guides of this type are believed well known in the art, they will not be further discussed herein.

Figure 4:
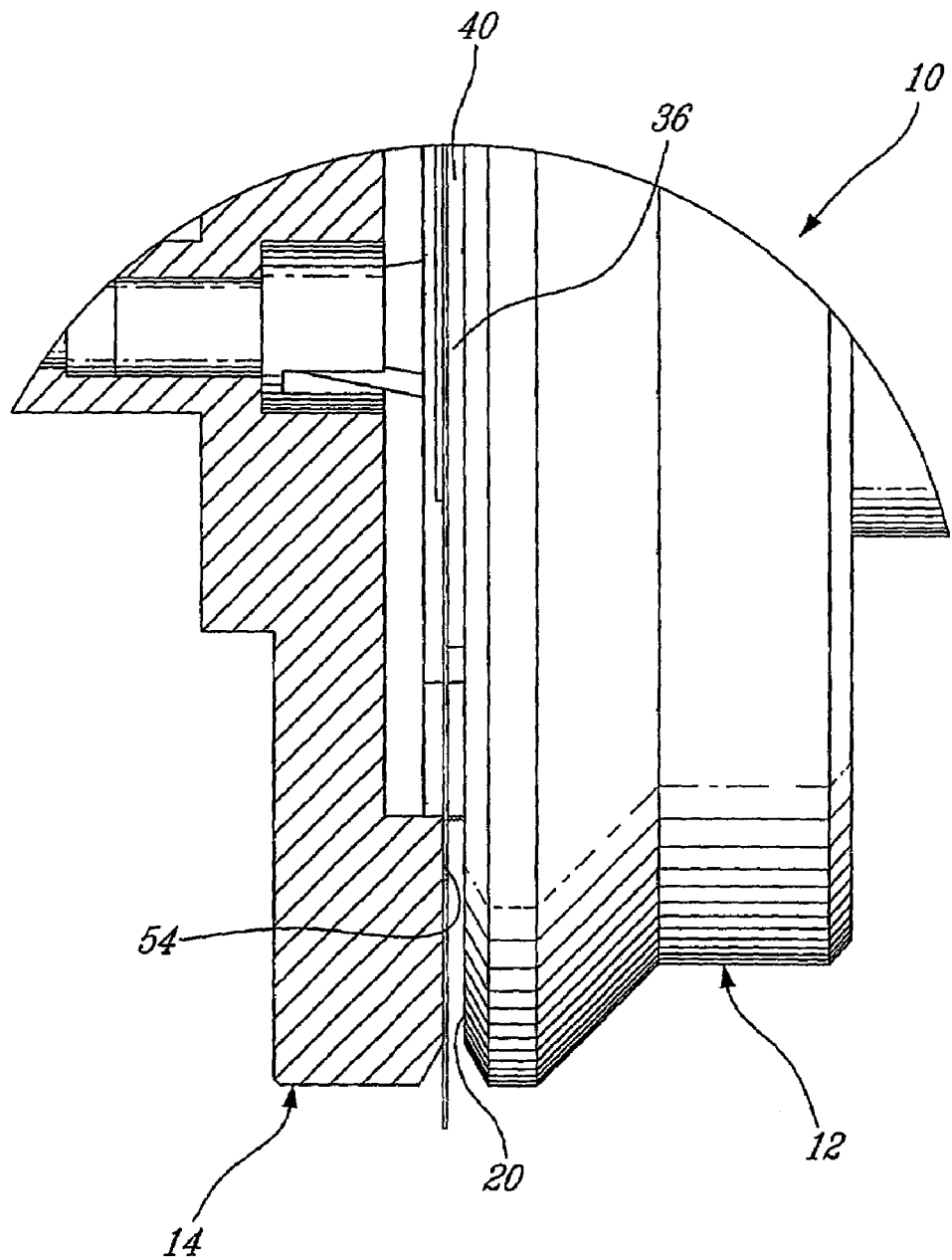
FIG. 4 is a sectional enlarged view of a portion of FIG. 3 during the winding of an inner layer of a coil arrangement.
Figure 5:
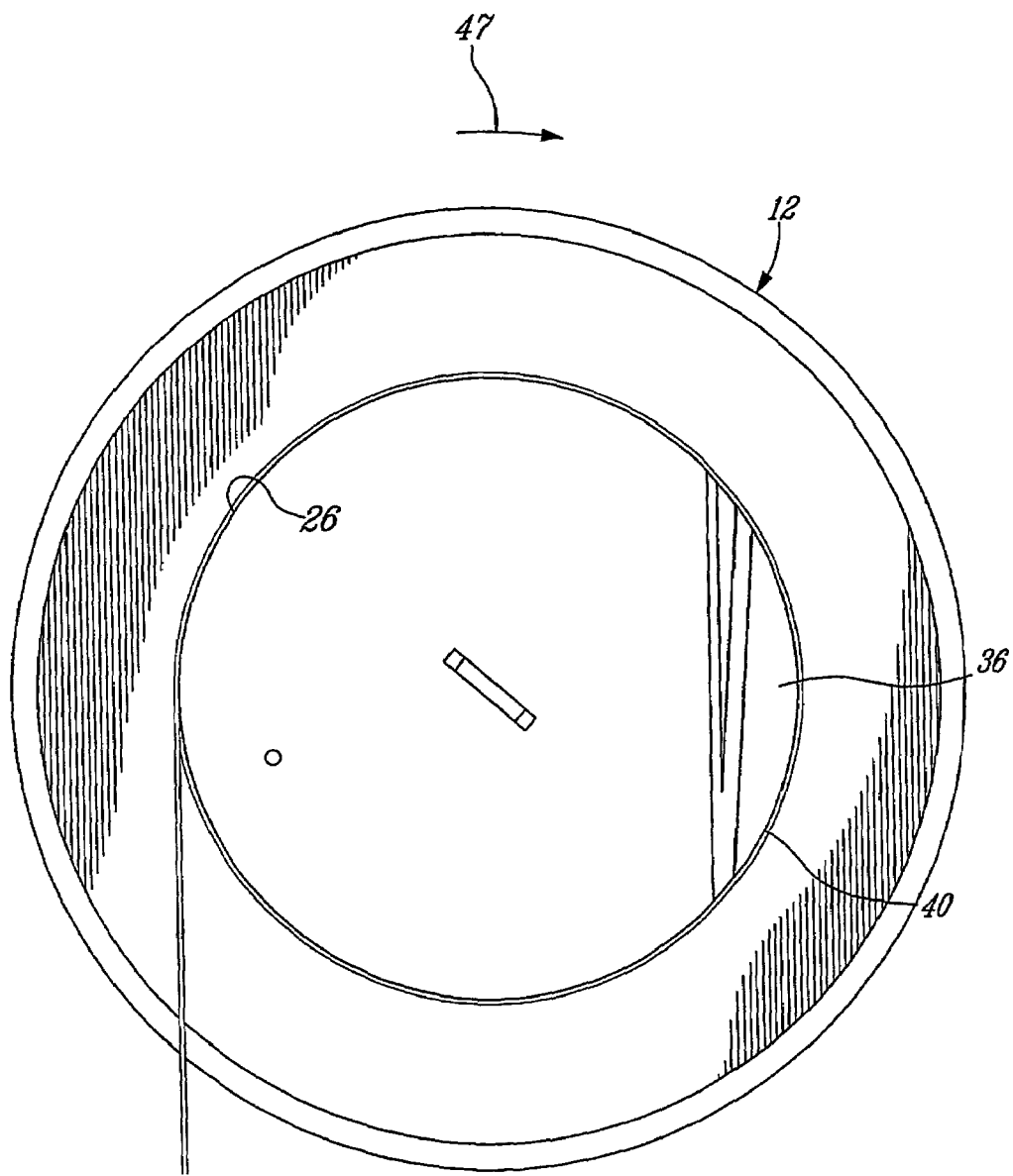
FIG. 5 is a front view of the flange during the winding of an inner layer of a coil arrangement.

FIGS. 4 and 5 illustrate the first step in the coil arrangement formation process, the winding of the supporting inner wire layer. More specifically, these figures illustrate the state of the spindle 10 after this step is done. It is to be noted that in the following figures the wire forming the coil is often shown in section, for clarity purposes.

As can be better seen from FIG. 4, the distance separating the faces 20 and 54 of the flange 12 and the counter-flange 14, respectively, define the width of the coil. It is to be noted that during this step this distance between the faces 20 and 54 is slightly smaller than the height of the external wall 36 of the mandrel 24. Therefore, only the first portion of the height of the mandrel 24 is exposed.

It is to be understood that while the inner wire layer consists of five turns of wire in the appended drawings, this number is arbitrary and depends on the size of the wire used, the width of the desired coil and the desired rigidity of the finished coil arrangement. For example, it would be possible to provide an inner wire layer consisting of only one turn of wire should the faces 20 and 54 be positioned closer than they appear in the appended drawings. Furthermore, in some instances it is possible to forego this step entirely, which would lead to a coil arrangement devoid of supporting inner wire layer.

As can be seen from FIG. 5, the inner layer of wire follows the winding surface 26 and the external surface 40 of the external wall 36, thereby defining the coil arrangement geometry.

Figure 6:
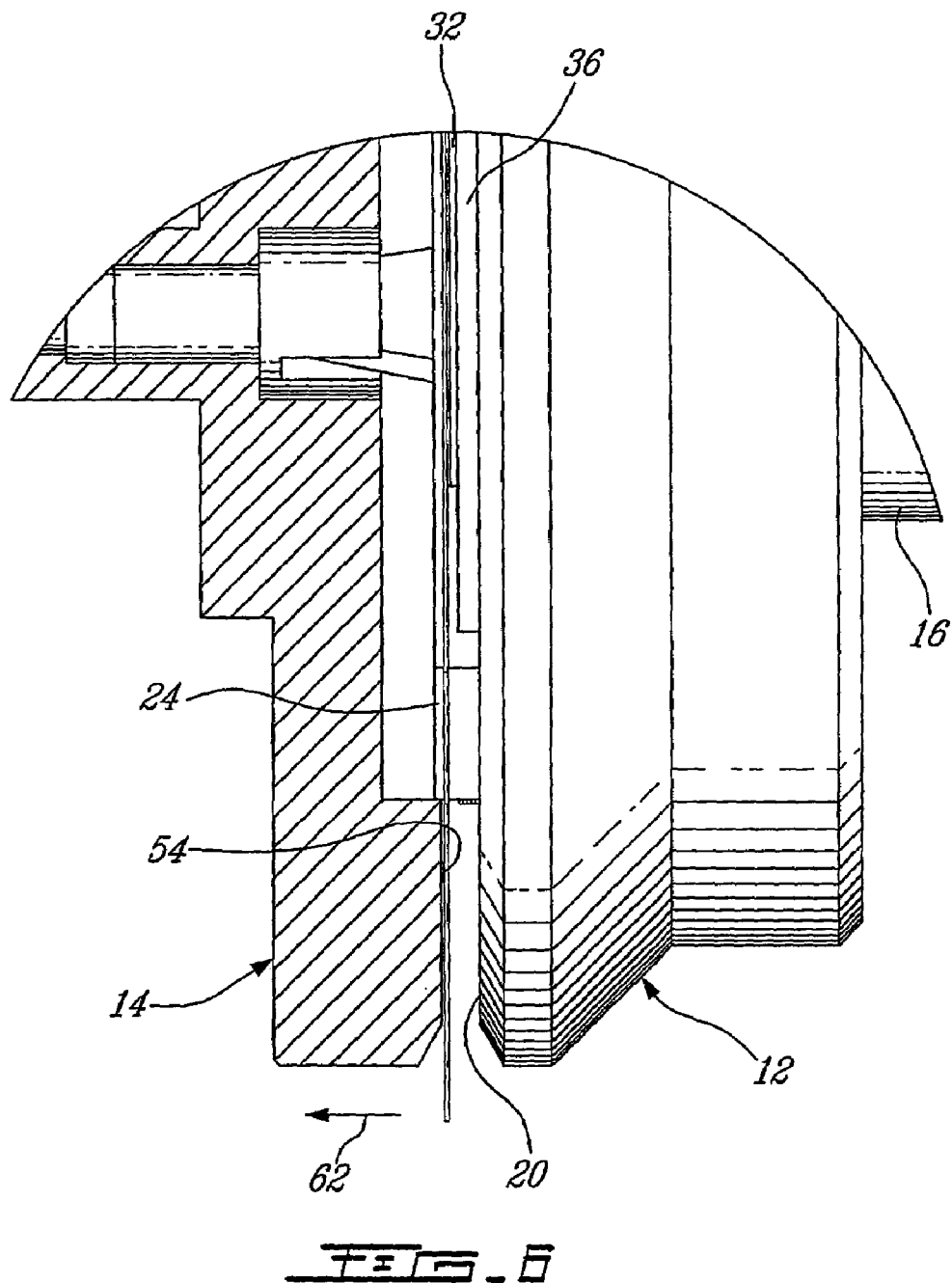
FIG. 6 is a sectional view of the spindle during the winding of a first coil terminal.
Figure 7:
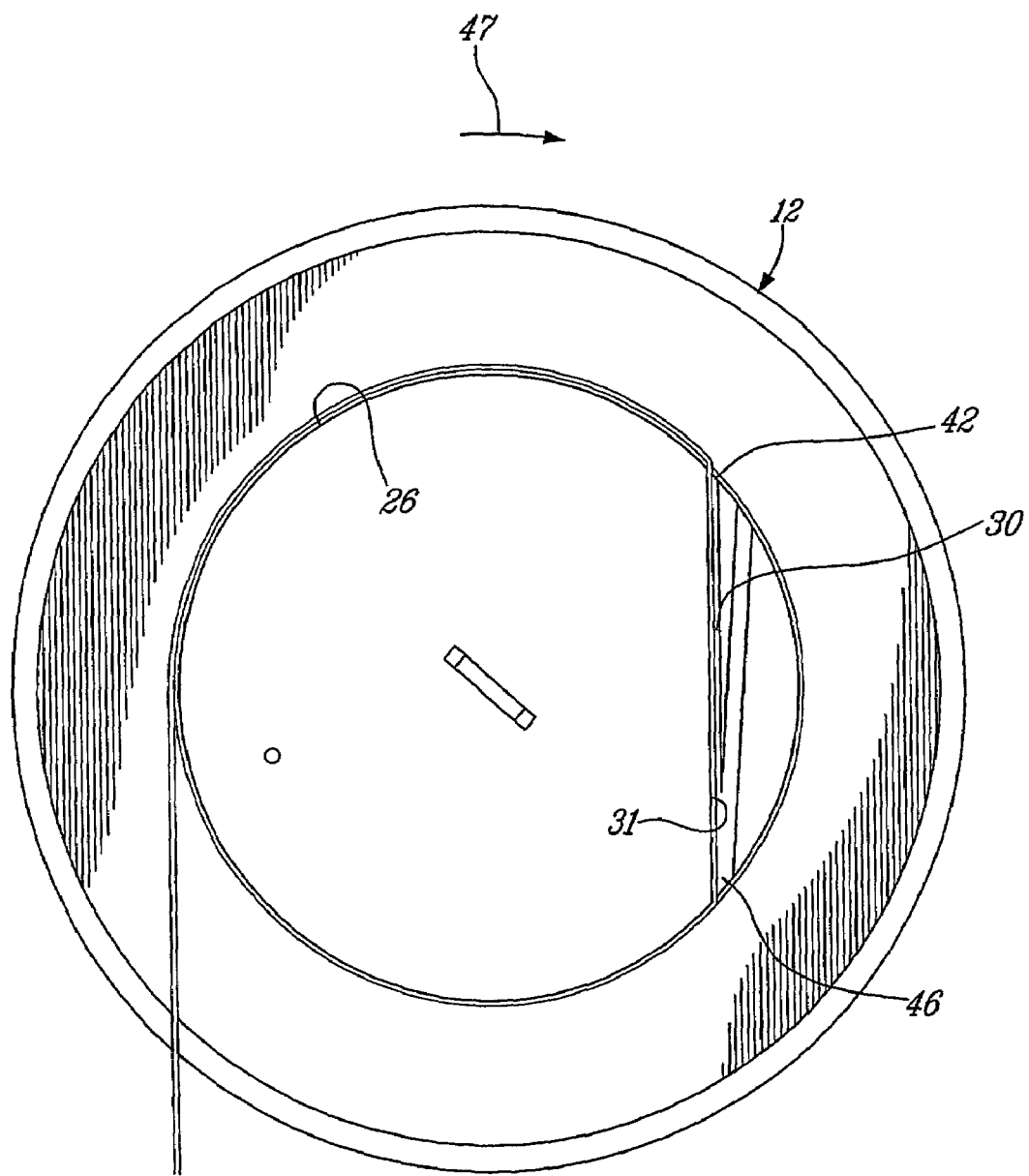
FIG. 7 is a front view of the flange during the winding of the first coil terminal.

FIGS. 6 and 7 of the appended drawings illustrate the winding of the first terminal 104 (see FIG. 14) of the coil arrangement. More specifically, these figures illustrate the state of the spindle 10 following this step is done.

The counter-flange 14 has been moved (see arrow 62) so that the distance between the faces 20 and 54 is greater than the height of both the walls 32 and 36 but still smaller than the height of the mandrel 24. Therefore, the first, second and third portions of the height of the mandrel 24 are exposed.

Since the guiding mechanism (not shown) guides the wire so that it is adjacent to the face 54 of the counter-flange 14, upon rotation of the spindle 10, the wire will enter the slot 30 via the inlet 46, abut the wall 31 by passing over the walls 32 and 36 and exit the slot 30 via the outlet 42.

FIG. 7 illustrates the first coil terminal being wounded. As can be clearly seen from this figure, the geometry of the coil terminal is different from the circular geometry of the inner layer since the first coil terminal is wound onto the third portion of the height of the mandrel 24.

Figure 8:
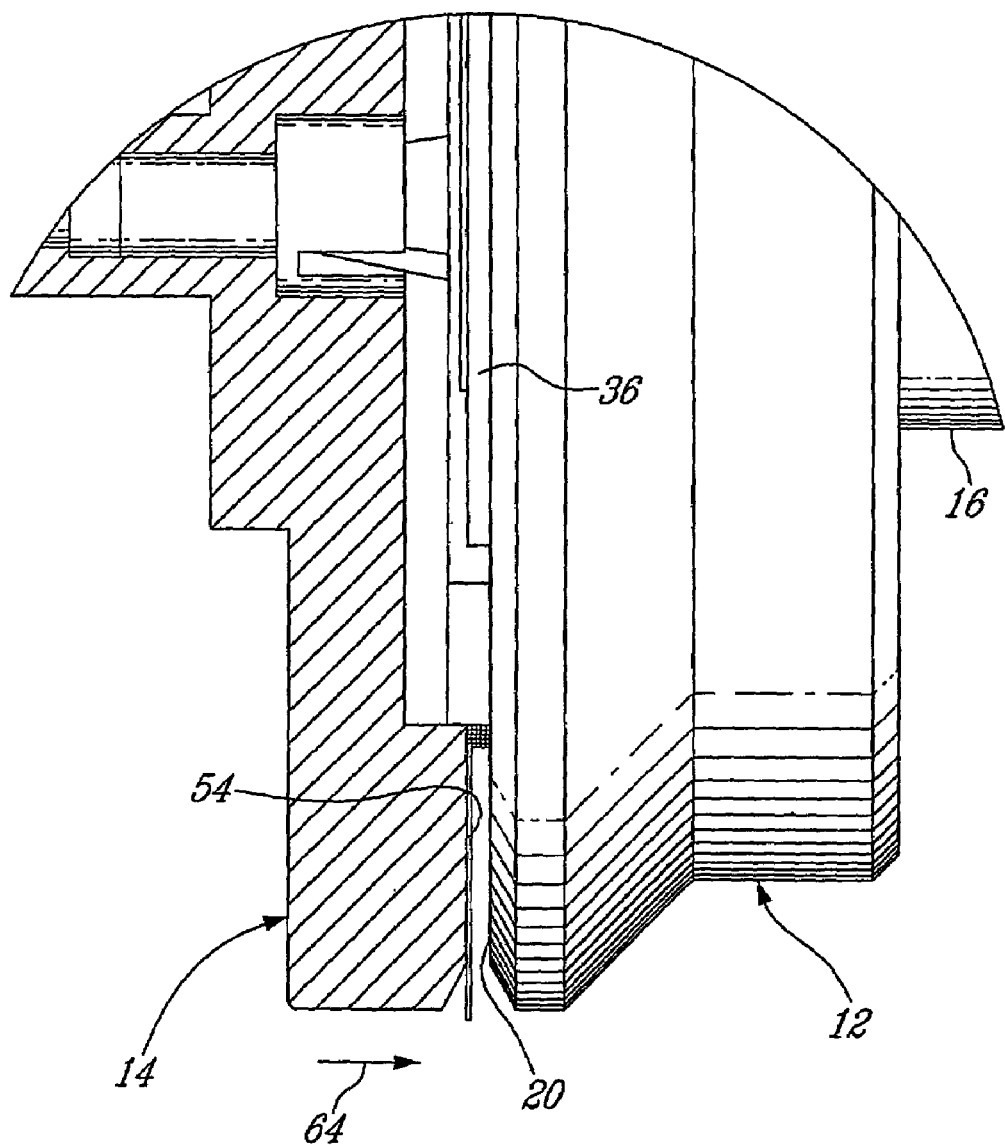
FIG. 8 is a sectional view of the spindle during the winding of the main winding layer.

Once the first coil terminal is wound, the counter-flange 14 returns to the position illustrated in FIG. 8 for the next step.

Figure 9:
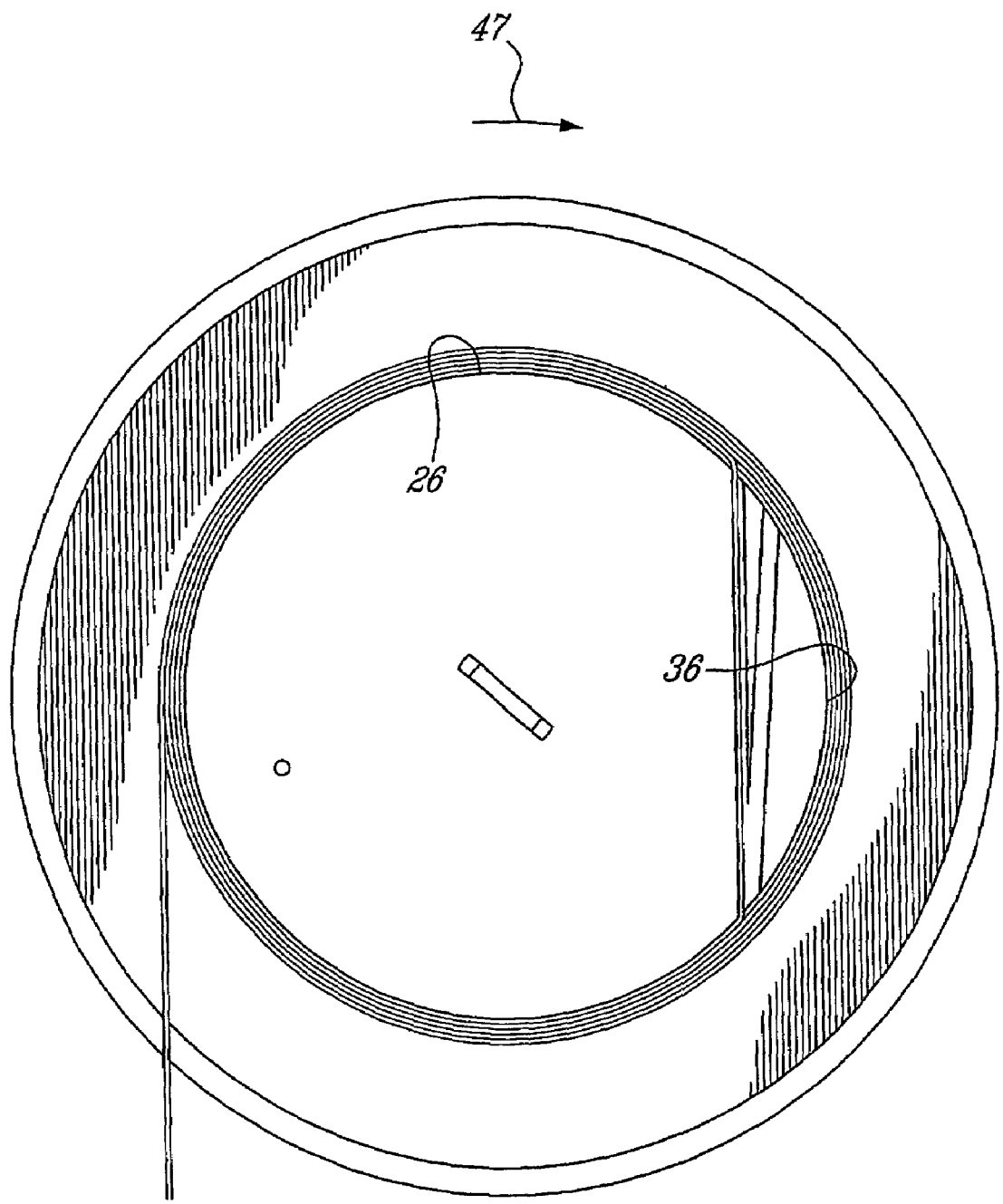
FIG. 9 is a front view of the flange during the winding of the main winding layer.

FIGS. 8 and 9 illustrate the winding of the active coil of the coil arrangement. More specifically, these figures illustrate the state of the spindle 10 after this step is done.

As mentioned hereinabove, the counter-flange 14 has been moved (see arrow 64) so that the distance between the faces 20 and 54 is back to being slightly smaller than the height of the wall 36. Therefore, only the first portion of the height of the mandrel 24 is exposed.

Once this is done, a predetermined number of turns may be wound onto the previously wound inner layer and first terminal. Of course, the number of turns of wire depends on the desired characteristics of the antenna. For example, up to 1200 turns of wire may be wound to yield the active coil, depending on the requirements of the microchip, the diameter and thickness of the air coil. It is believed to be within the reach of one skilled in the art to determined the number of turns of wire required for a particular application.

As can be seen from FIG. 9, the active coil follows the winding surface 26 and the external surface 40 of the external wall 36, thereby following the coil arrangement geometry.

Figure 10:
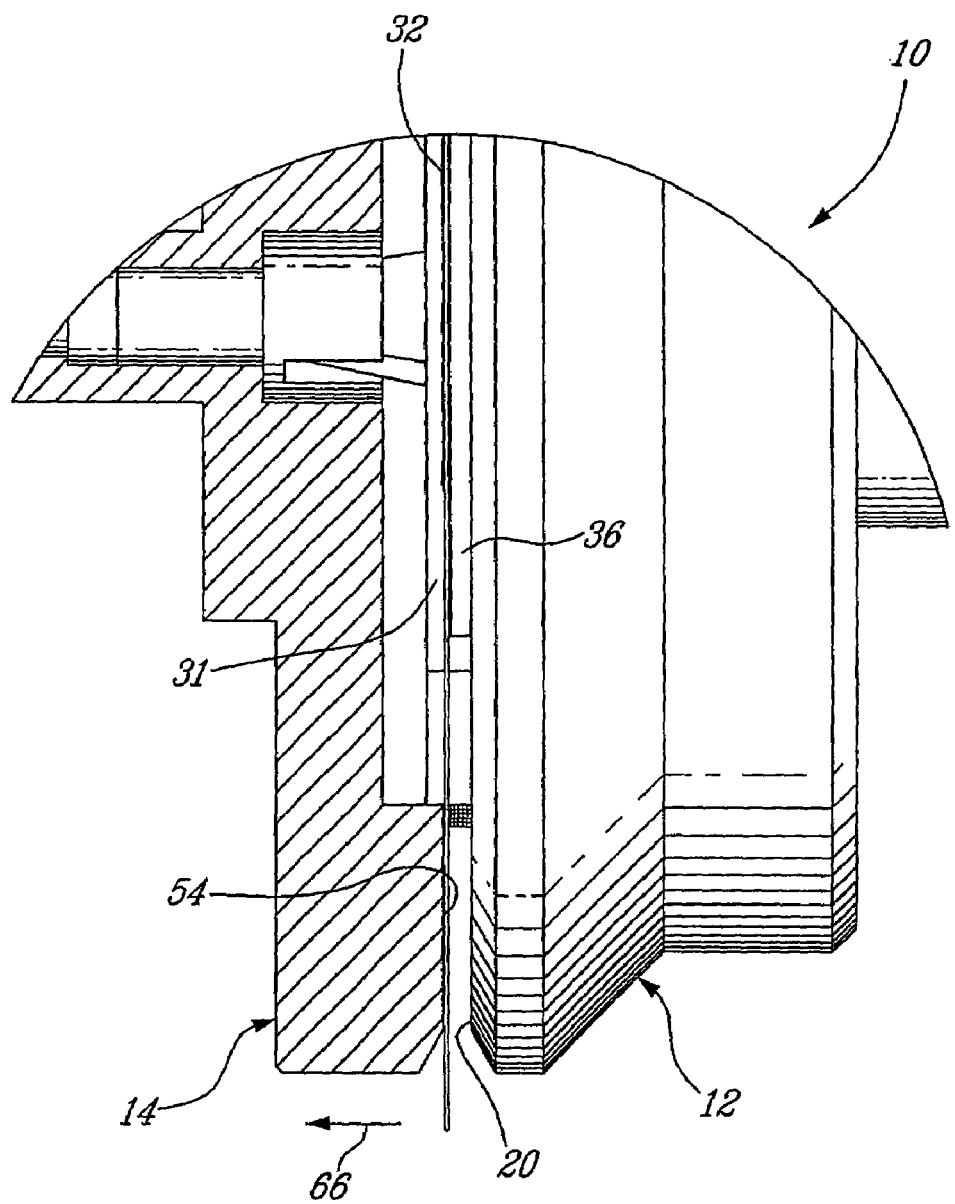
FIG. 10 is a sectional view of the spindle during the winding of the second coil terminal.
Figure 11:
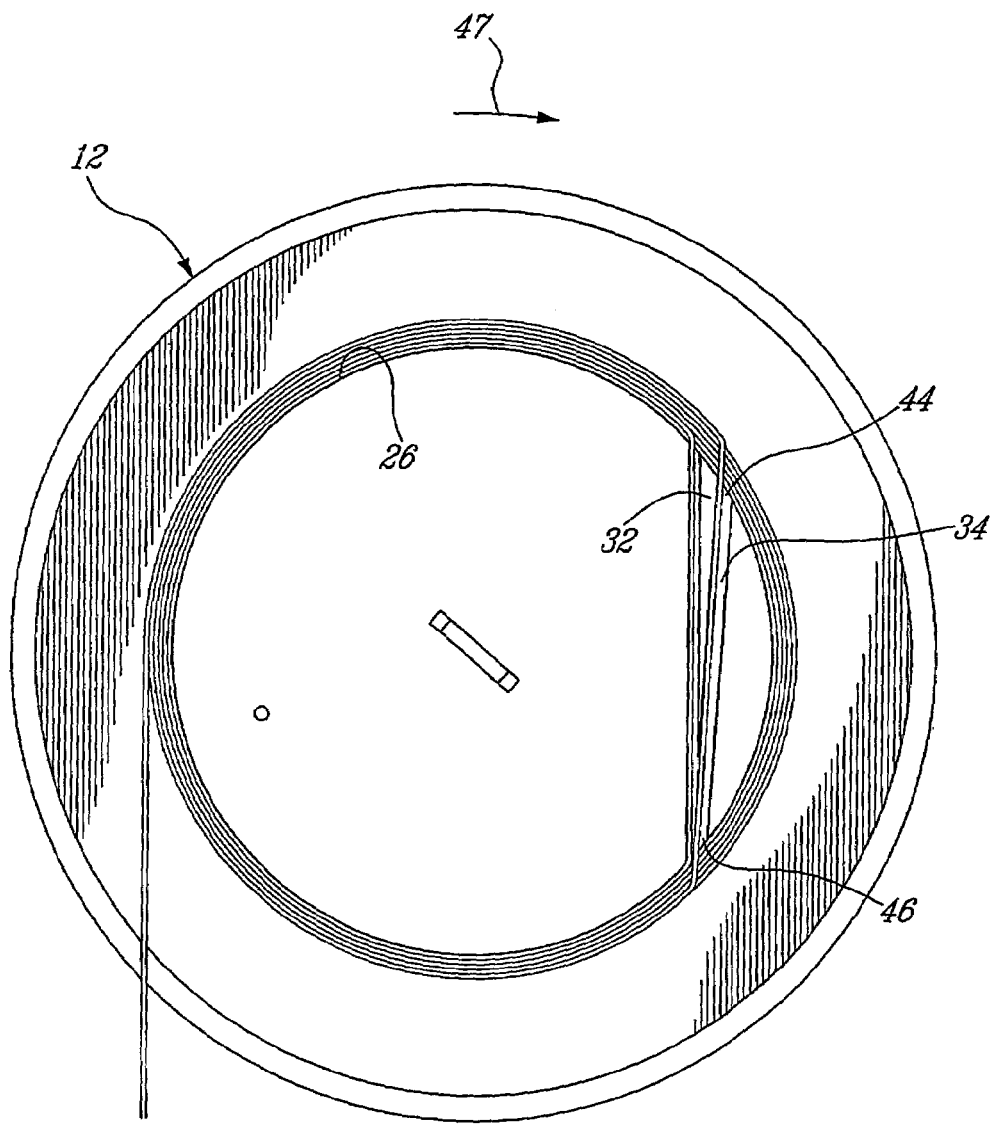
FIG. 11 is a front view of the flange during the winding of the second coil terminal.

Turning now to FIGS. 10 and 11, the formation of the second coil terminal 106 (see FIG. 14) will be described. These figures illustrate the state of the spindle 10 after this step is done.

As can be seen from FIG. 10, the counter-flange 14 has been moved (see arrow 66) so that the distance separating the faces 20 and 54 is greater than the height of the external wall 36 but smaller than the height of the intermediate wall 32. Therefore, only the first and second portions of the height of the mandrel 24 are exposed.

Since the guiding mechanism (not shown) guides the wire so that it is adjacent to the face 54 of the counter-flange 14, upon rotation of the spindle 10, the wire will enter the slot 34 via the inlet 46, abut the intermediate wall 32 by passing over the wall 36 and exit the slot 34 via the outlet 42.

FIG. 11 illustrates the second coil terminal being wounded. As can be clearly seen from this figure, the geometry of the coil terminal is different from the circular geometry of the inner layer, the active coil and of the geometry of the first terminal.

Figure 12:
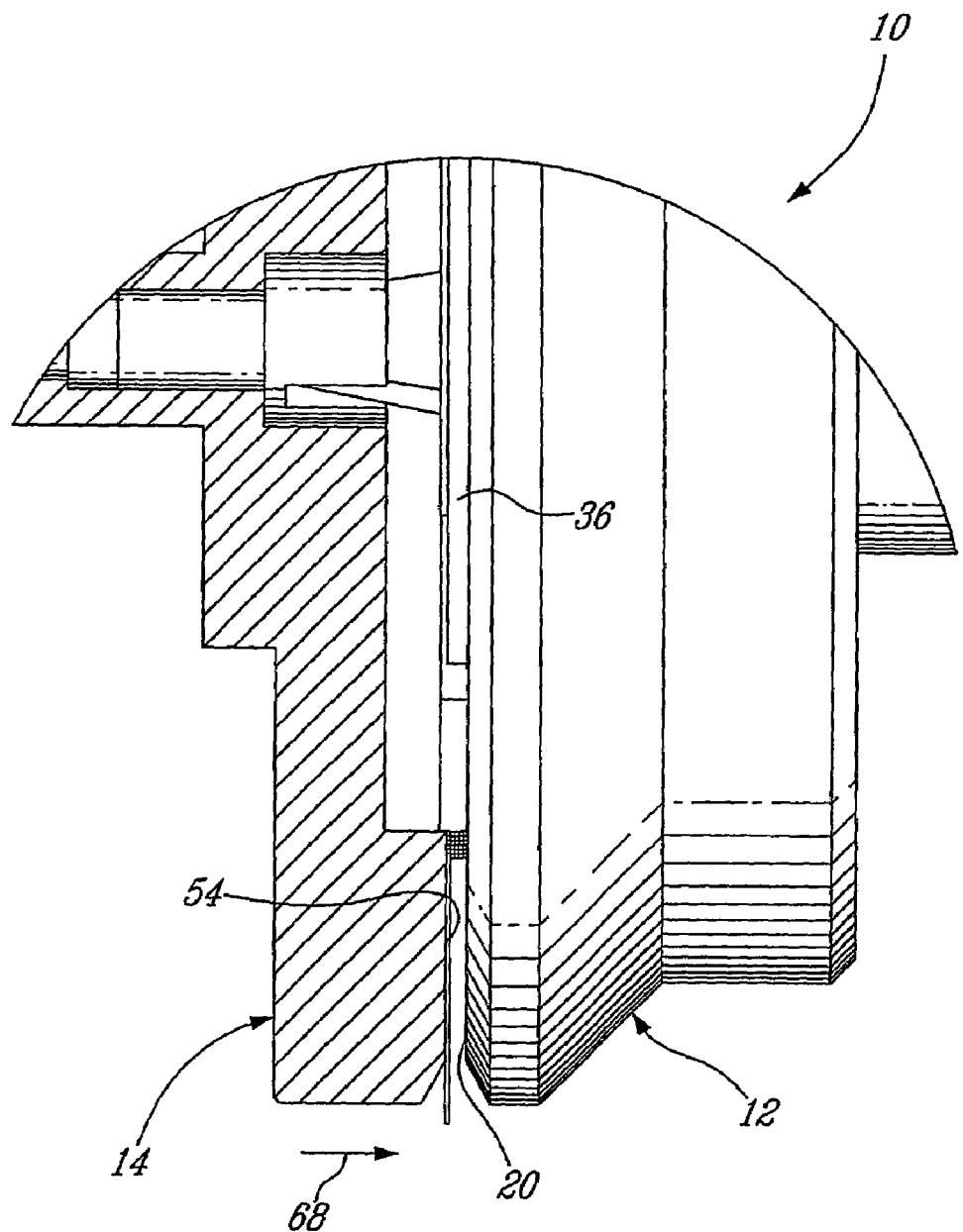
FIG. 12 is a sectional view of the spindle during the winding of the outer layer of the coil.

Once the second coil terminal is wounded, the counter-flange 14 returns to the position illustrated in FIG. 12 for the next step.

Figure 13:
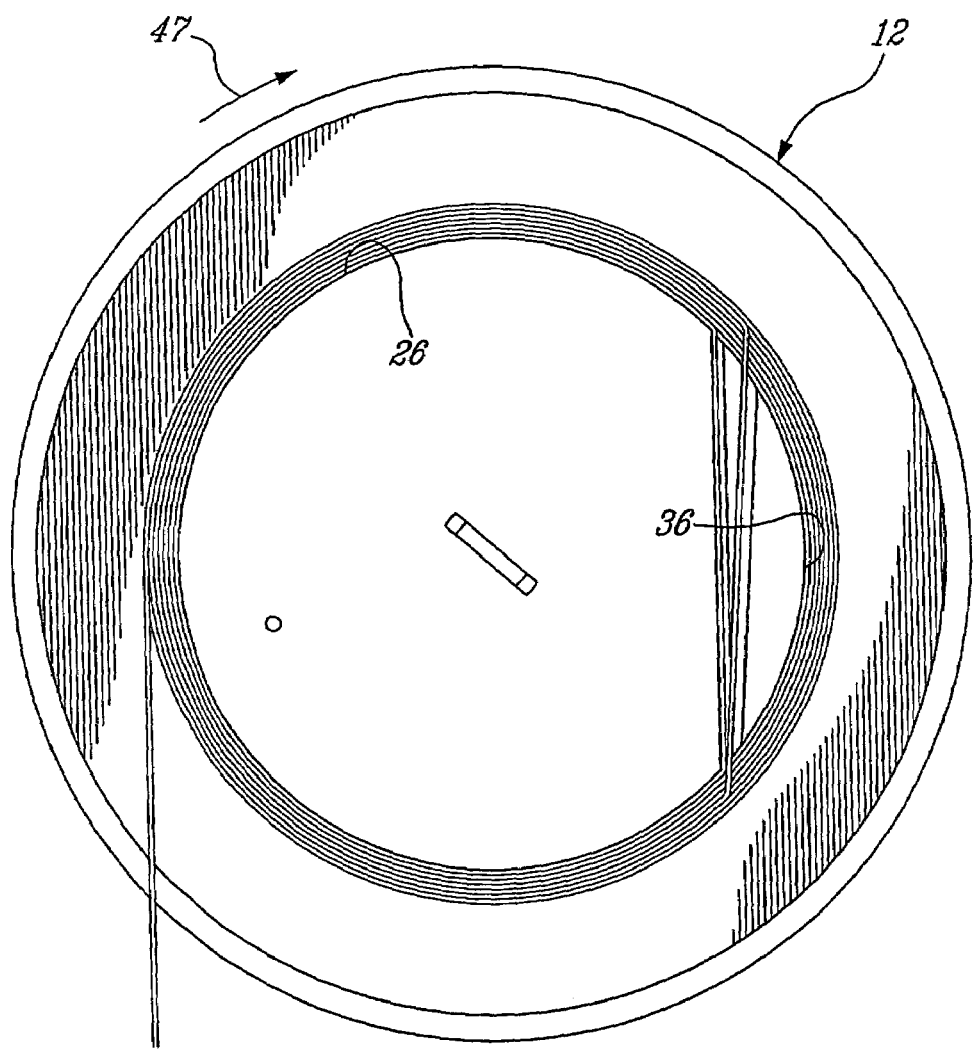
FIG. 13 is a front view of the flange during the winding of the outer layer of the coil.

FIGS. 12 and 13 illustrate the winding of the supporting outer layer of the coil arrangement.

The counter-flange 14 has been moved (see arrow 68) so that the distance between the faces 20 and 54 is again slightly smaller than the height of the external wall 36. Therefore, only the first portion of the height of the mandrel 24 is exposed.

It is to be understood that while the supporting outer wire layer consists of five turns of wire in the appended drawings, this number is arbitrary and depends of the size of the wire used and of the width of the finished coil.

As can be seen from FIG. 13, the outer layer of wire follows the winding surface 26 and the external surface 40 of the external wall 36, thereby following the coil arrangement geometry.

Once the outer layer of wire has been wound, the wire can be cut and the completed coil 100 is ready to be unloaded from the spindle 10. The counter-flange 14 throws out of gear as illustrated in FIG. 3. The retractable portion 17 of the shaft 16 is then moved back (see arrow 70), pulling with it the mandrel 24, forcing the finished coil out of the mandrel 24 since it abuts the face 20 of the flange 14.

It is to be noted that while the description hereinabove states that the flange 12 is connected to a motor (not shown) and that the counter-flange 14 is driven by the engagement of the clutch elements 22 and 52, it would be within the reach of one skilled in the art to connect the counter-flange 14 to a motor instead and let the flange 12 be driven.

Similarly, the counter-flange 14 could be axially fixed and the flange 12 could move axially to selectively expose the first, first and second, or first second and third portions of the height of the mandrel 24.

It is to be noted that while the above description specifies that the first coil terminal goes through slot 30 and the second coil terminal goes through slot 34, this is not essential to the present invention. Indeed, the first coil terminal could be wound into slot 34 and the second coil terminal could be wound into slot 30.

Similarly, while the appended drawings illustrate that the first and second terminals are would near the face 54 of the counter-flange 14, it is not necessarily so.

Turning now to FIGS. 15 to 22 of the appended drawings, other possible configurations of coil arrangements made according to embodiments of the present invention will be described. It is to be noted that other configurations and geometries, not shown herein, are possible within the scope of the present invention.

FIG. 15 illustrates a coil arrangement 200 also having a circular geometry but where the geometry of the first and second coil terminals 202 and 204 is different. Indeed, while being generally D-shaped, instead of converging as illustrated in FIG. 14, the straight portions of the terminals 202 and 204 are parallel and located on the same side of the coil arrangement.

FIG. 16 illustrates, in a perspective view, a flange 206 provided with a mandrel 208 used to wind the coil arrangement 200. The mandrel 208 is very similar to the mandrel 24 discussed hereinabove. The slots 210 and 212 are parallel and are separated by two intermediate wall portions 214a and 214b. An external wall 216 completes the circular cross-section of the first portion of the height of the mandrel 208.

As can be clearly be seen from this figure, the intermediate wall is not full length and the main portion of the mandrel 208 includes a generally U-shaped clearance 218. These features are intended to reduce the surface of contact between the straight portions of the first and second terminals 202 and 204 and thereby to reduce the friction between the straight portions and the mandrel 208 when the finished coil 200 is removed from the flange 206. In turn, this reduced friction provides terminals that remain straight.

One skilled in the art will have no difficulty in transposing these features to the other embodiments of mandrels described herein.

Figure 17:
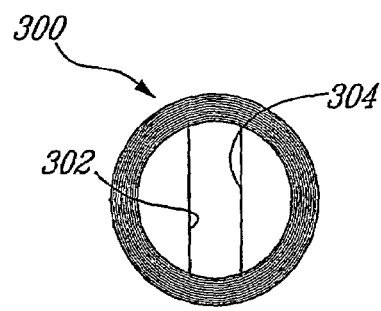
FIG. 17 is a front view of a coil arrangement according to a third embodiment of the present invention.

FIG. 17 illustrates a coil arrangement 300 also having a circular geometry but where the geometry of the first and second coil terminals 302 and 304 is different. Indeed, instead of being close apart as illustrated in FIG. 15, the straight portions of the terminals 302 and 304 are parallel and located on opposite sides of the coil arrangement. The coil arrangement 300 is especially adapted to the ultra small coils for which the terminal spacing is about their diameter.

Figure 18:
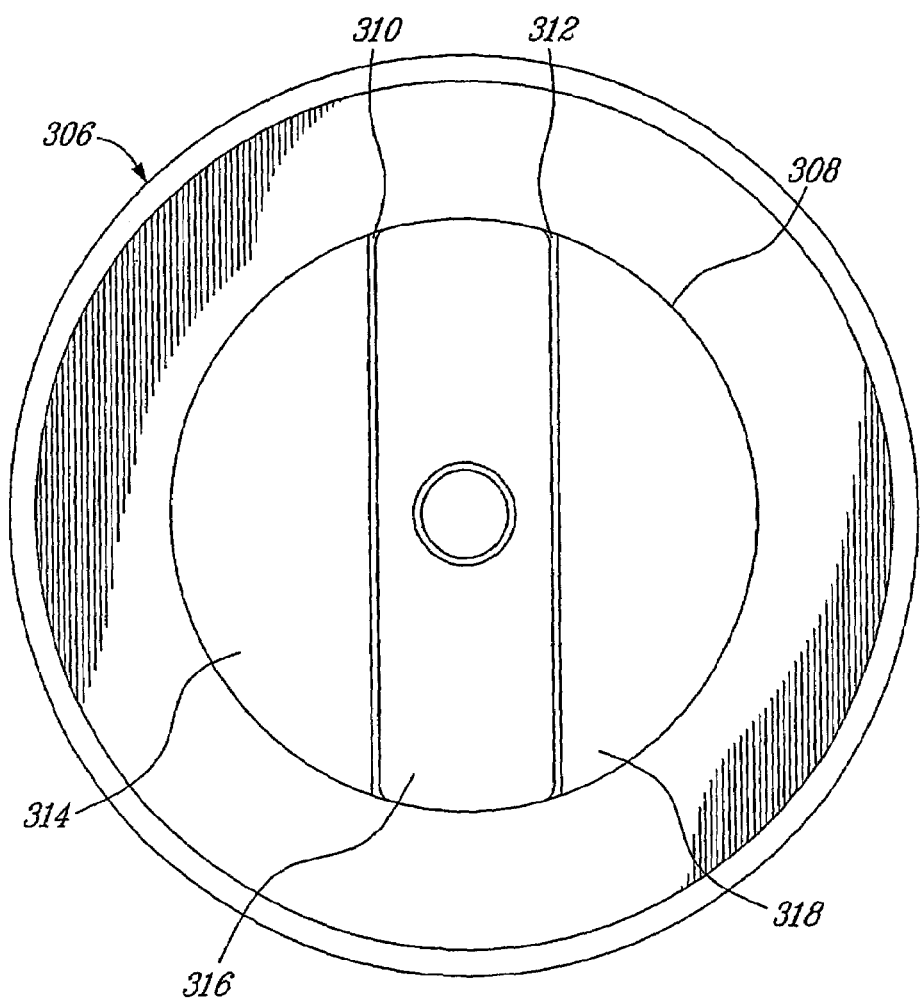
FIG. 18 is a front view of a flange used to obtain the coil arrangement of FIG. 17.

FIG. 18 illustrates a flange 306 provided with a mandrel 308 used to wind the coil arrangement 300 of FIG. 17. The mandrel 308 includes two slots 310 and 312 separated by wall portions 314, 316 and 318. The height of the wall portion 318 is smaller than the height of the wall portion 314 which itself is smaller than the height of the wall portion 316. The winding of the coil arrangement 300 follows generally the same steps as the winding of the coil arrangement 100 describe hereinabove.

One skilled in the art will easily understand that the height of the wall portions 314 and 318 could be equal. If this is the case, the terminals would be wound by turning the flange 306 by half a turn.

Figure 19:
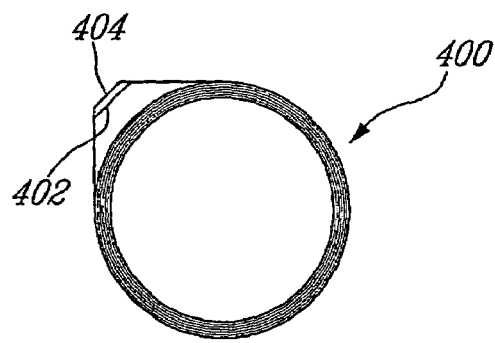
FIG. 19 is a front view of a coil arrangement according to a fourth embodiment of the present invention.

FIG. 19 illustrates a circular geometry coil arrangement 400 provided with coil terminals 402 and 404 extending outside the circular geometry.

Figure 20:
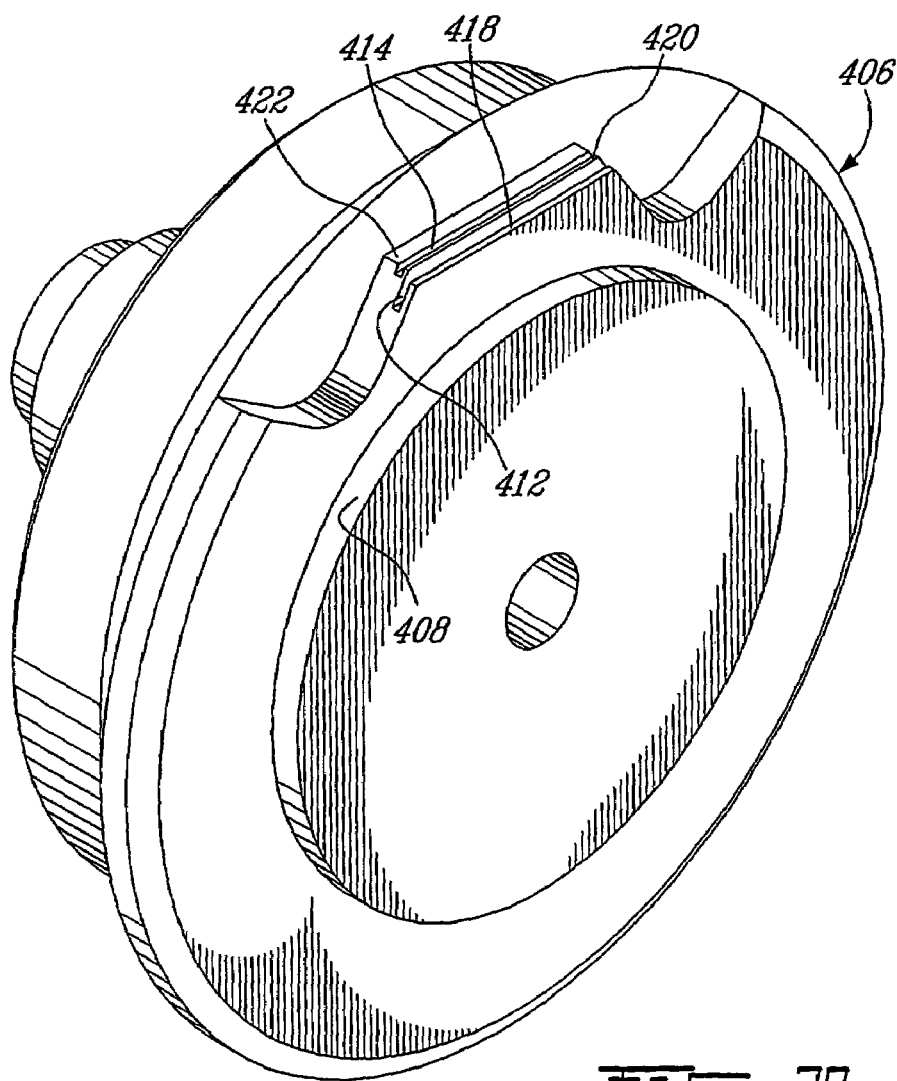
FIG. 20 is a perspective view of a flange used to obtain the coil arrangement of FIG. 19.

FIG. 20 illustrates, in a perspective view, a flange 406 provided with a mandrel 408 used to wind the coil 400 of FIG. 19. The mandrel 408 is circular and is used to wind the supporting inner and outer layers and the active layer of the coil arrangement 400. The face 410 of the spindle 406 is generally flat but includes the slots 412 and 414 axially recessed therein. A front wall 418 and an intermediate wall 420 define the slot 412 while the intermediate wall 420 and a rear wall 422 define the slot 414.

The winding steps of the coil arrangement 400 are very similar to the winding steps of the coil arrangement 100 described in detail hereinabove. However, the coiling of the first and second terminals 402 and 404 is done by moving either the flange 406 or the wire guide (not shown) so that the wire is wound in a corresponding slot.

To remove the finished coil arrangement from the flange 406, the mandrel 408 is retracted as discussed with respect to the mandrel 24, thereby allowing the terminals 402 and 404 to exit their respective slot.

Figure 21:
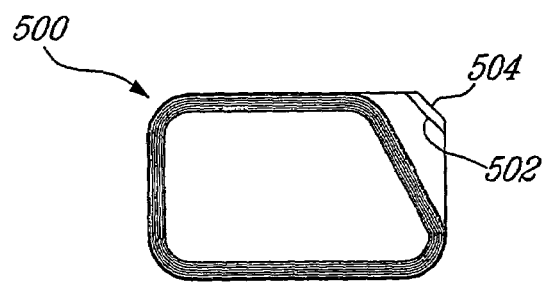
FIG. 21 is a front view of a coil arrangement according to a fourth embodiment of the present invention.

FIG. 21 illustrates a fourth variant for a coil arrangement 500. The geometry of the coil arrangement 500 being generally trapezoid. The geometry of the coil terminals 502 and 504 being generally rectangular and extending outside the geometry of the coil arrangement 500.

Figure 22:
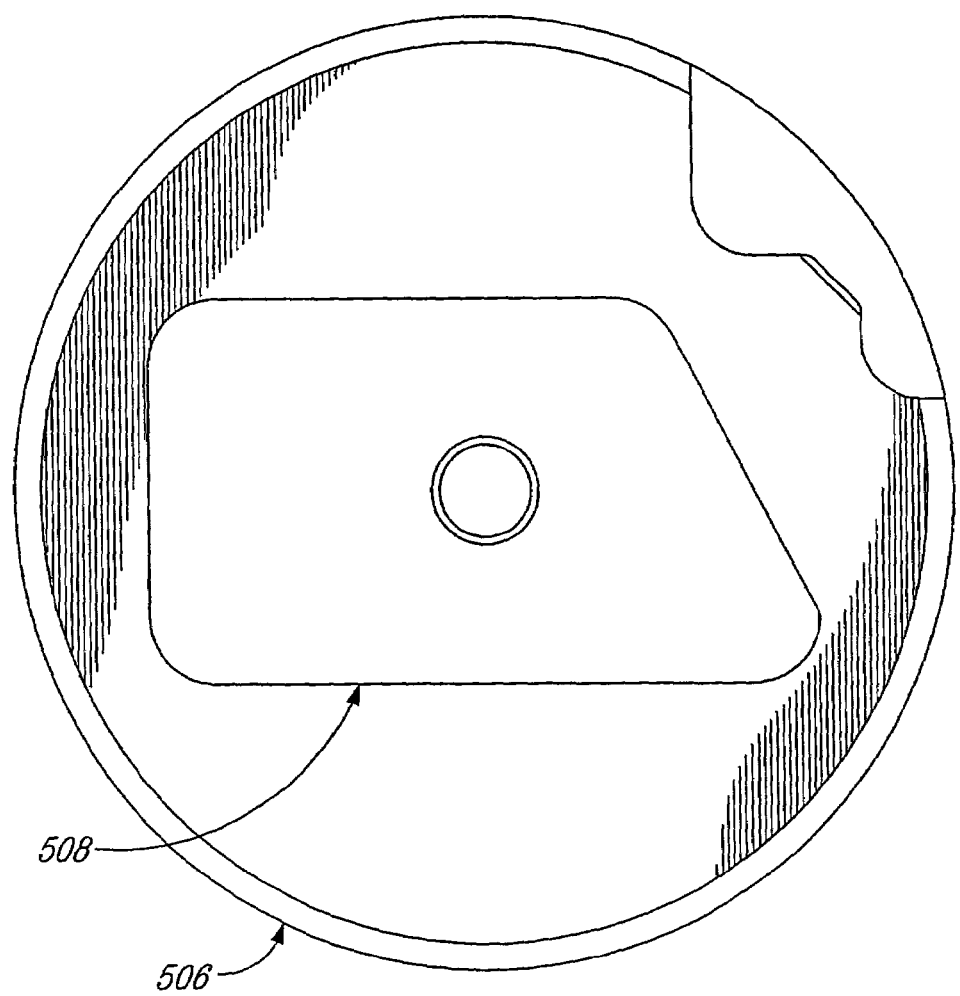
FIG. 22 is a front view of a flange used to obtain the coil arrangement of FIG. 20.

FIG. 22 illustrates a flange 506 very similar to the flange 406 discussed hereinbelow. The main difference between these flanges being the cross sectional shape of the mandrel 508 designed to yield the trapezoid shape of the coil arrangement 500. The other features being identical to the features of the flange 406.

As will easily be understood by one skilled in the art, the coil arrangements made according to the present invention are interesting since they are self-supporting and since the terminals are always indentically positioned from one coil to the next, therefore simplifying the connection of the terminals to the microchip. For example, thermo-compression and ultrasonic welding techniques could be used.

It is to be noted that the present invention is very useful for the RFID tags operating at 13.56 MHz and above. In this case, the active coil is formed by no more than 5 or 6 turns. Without the additional wire inner and outer layers, the resulting coil would have been both very difficult to handle and would hardly resist the product lifetime.

Although the present invention has been described hereinabove by way of preferred embodiments thereof, it can be modified, without departing from the spirit and nature of the subject invention as defined in the appended claims.

What is claimed is:

1. A coil arrangement for a radio-frequency identification device made of a wire; said coil arrangement comprising:
    a first coil terminal made of one turn of the wire; said first coil terminal having a first coil terminal geometry;
    a active coil made of a predetermined number of turns of the wire; said active coil defining a geometry of said coil arrangement;
    a second coil terminal made of one turn of the wire; said second coil terminal having a second coil terminal geometry; and
    wherein said coil arrangement geometry, said first coil geometry and said second coil geometry are different.

2. The coil arrangement of claim 1 further comprising an inner supporting layer made of at least one turn of the wire; said inner layer following said geometry of said coil arrangement.

3. The coil arrangement of claim 1 further comprising an outer supporting layer made of at least one turn of the wire; said outer layer following said geometry of said coil arrangement.

4. The coil arrangement of claim 2 further comprising an outer supporting layer made of at least one turn of the wire; said outer layer following said geometry of said coil arrangement.

5. The coil arrangement of claim 1, wherein said geometry of said coil arrangement is generally circular.

6. The coil arrangement of claim 5, wherein said first terminal geometry is generally D-shaped, being provided with a curved portion and a straight portion.

7. The coil arrangement of claim 6, wherein said second terminal geometry is generally D-shaped, being provided with a curved portion and a straight portion.

8. The coil arrangement of claim 7, wherein said D-shaped first and second geometries being so configured that said straight portions thereof converge.

9. The coil arrangement of claim 8, wherein said D-shaped first and second geometries being so configured that said straight portions thereof are generally parallel.

10. The coil arrangement of claim 9, wherein said straight portions are close to one another.

11. The coil arrangement of claim 9, wherein said straight portions are positioned about a central point of said generally circular geometry of said coil arrangement.

12. The coil arrangement of claim 9, wherein said straight portions are positioned symmetrically about a central point of said generally circular geometry of said coil arrangement.

13. The coil arrangement of claim 1, wherein said first terminal geometry extends outside said geometry of said coil arrangement; said first terminal geometry having a generally straight portion.

14. The coil arrangement of claim 13, wherein said second terminal geometry extends outside said geometry of said coil arrangement; said second terminal geometry having a generally straight portion parallel to said straight portion of said first terminal geometry.

15. The coil arrangement of claim 14, wherein said coil arrangement geometry is generally circular.

16. The coil arrangement of claim 14, wherein said coil arrangement geometry is generally trapezoid.

17. A process for making a coil arrangement for a radio-frequency identification device from a wire; said method comprising:
    making a first coil terminal by winding one turn of the wire; said first coil terminal having a first coil terminal geometry;
    making an active coil by winding a predetermined number of turns of the wire; said active coil defining a coil arrangement geometry;
    making a second coil terminal by winding one turn of the wire; said second coil terminal having a second coil terminal geometry; and
    making a supporting outer layer by winding at least one turn of the wire;
    wherein said coil arrangement geometry, said first coil geometry and said second coil geometry are different.

18. The process of claim 17 further comprising making a supporting inner layer by winding at least one turn of the wire; said inner layer following the geometry of the coil arrangement.

19. The process of claim 17 further comprising making a supporting outer layer by winding at least one turn of the wire; said inner layer following the geometry of the coil arrangement.

20. A process for making a coil arrangement for a radio-frequency identification device from a wire; said method comprising:
    providing a mandrel having a rotation axis, a first portion having a predetermined cross-sectional profile, a second portion having a predetermined cross-sectional profile and positioned axially adjacent to the first portion and a third portion having a predetermined cross-sectional profile and positioned axially adjacent to the second portion;

making a first coil terminal by winding one turn of the wire onto the second portion of the mandrel;

making an active coil by winding a predetermined number of turns of the wire onto the first portion of the mandrel; and making a second coil terminal by winding one turn of the wire onto the third portion of the mandrel.

21. The process of claim 20, comprising making a supporting inner layer by winding at least one turn of the wire onto the first portion of the mandrel.

22. The process of claim 20, comprising making a supporting outer layer by winding at least one turn of the wire onto the first portion of the mandrel.

23. The process of claim 20, wherein the first portion cross-sectional profile is generally circular.

24. The process of claim 23, wherein the second portion cross-sectional profile is generally D-shaped, being provided with a curved portion and a straight portion.

25. The process of claim 24, wherein the second portion cross-sectional profile is generally D-shaped, being provided with a curved portion and a straight portion.

26. The process of claim 25, wherein the D-shaped cross-sectional profiles of the second and third portions are so configured that the straight portions thereof converge.

27. The process of claim 25, wherein the D-shaped cross-sectional profiles of the second and third portions are so configured that the straight portions thereof are generally parallel.

28. The process of claim 27, wherein the straight portions are close to one another.

29. The process of claim 27, wherein the straight portions are positioned about a central point of the circular cross-sectional profile of the first portion.

30. The process of claim 27, wherein the straight portions are positioned symmetrically about a central point of the circular cross-sectional profile of the first portion.

31. The process of claim 20, wherein the cross sectional profile of the second portion extends outside the cross-sectional profile of the first portion; the cross-sectional profile of the second portion having a generally straight portion.

32. The process of claim 31, wherein the cross sectional profile of the third portion extends outside the cross-sectional profile of the first portion; the cross-sectional profile of the second portion having a generally straight portion parallel to the straight portion of the cross-sectional profile of the second portion.

33. The process of claim 32, wherein the cross-sectional profile of first portion is generally circular.

34. The process of claim 32, wherein the cross-sectional profile of first portion is generally trapezoid.

35. A spindle for making a coil arrangement comprising:
a flange rotatable about a rotation axis; said flange having a flat face and a mandrel of a predetermined height; said mandrel generally defining a geometry of the coil arrangement via a peripheral coil winding surface; said mandrel having a first slot and a second slot separated by an intermediate wall having a height smaller than the height of the mandrel; said mandrel being also provided with an external wall having a height smaller than the height of the intermediate wall;

a counter-flange rotatable about said rotation axis; said counter-flange having a flat face and a recess configured and sized to receive at least a portion of said mandrel;

one of said flange and said counter-flange being so configured as to be axially movable along said rotation axis to modify the portion of said predetermined height of said mandrel received in said counter-flange, thereby selectively allow a wire forming the coil to enter either said first and second slots.

36. The spindle of claim 35, wherein said first and second slots are so configured as to converge.

37. The spindle of claim 35, wherein said first and second slots are so configured as to be generally parallel.

38. A spindle for making a coil arrangement comprising:
a flange rotatable about a rotation axis; said flange having a flat face and a mandrel; said mandrel generally defining a geometry of the coil arrangement via a peripheral coil winding surface; said mandrel having:

a central portion having a predetermined height;

a first semi-circular wall portion separated from said first semi-circular wall portion by a first slot; said first semi-circular wall portion having a height smaller than said predetermined height;

a second semi-circular wall portion opposite said first semi-circular wall portion; said second semi-circular wall portion being separated from said central portion by a second slot and having a height smaller than said predetermined height; said first and second slots being generally parallel;

a counter-flange rotatable about said rotation axis; said counter-flange having a flat face and a recess configured and sized to receive at least a portion of said mandrel;

one of said flange and said counter-flange being so configured as to be axially movable along said rotation axis to modify the portion of said predetermined height of said mandrel received in said counter-flange, thereby selectively allow a wire forming the coil to enter either said first and second slots.

39. A spindle for making a coil arrangement, said spindle comprising:
a flange rotatable about a rotation axis; said flange having a predetermined thickness; said flange having a first cross-sectional profile for a first portion of said predetermined thickness, a second cross-sectional profile for a second portion of said predetermined thickness and a third cross-sectional profile for a third portion of said predetermined thickness;

a counter-flange rotatable about said rotation axis; said counter-flange having a flat face and a recess configured and sized to receive at least a portion of said mandrel;

one of said flange and said counter-flange being so configured as to be movable along said rotation axis to expose either said first, said first and second; and said first, second and third portions of said mandrel.

40. The spindle of claim 39, wherein said first portion cross-sectional profile is generally circular.

41. The spindle of claim 40, wherein said second portion cross-sectional profile is generally D-shaped, being provided with a curved portion and a straight portion.

42. The spindle of claim 41, wherein said second portion cross-sectional profile is generally D-shaped, being provided with a curved portion and a straight portion.

43. The spindle of claim 42, wherein said D-shaped cross-sectional profiles of said second and third portions are so configured that said straight portions thereof converge.

44. The spindle of claim 42, wherein said D-shaped cross-sectional profiles of said second and third portions are so configured that said straight portions thereof are generally parallel.

45. The spindle of claim 44, wherein said straight portions are close to one another.

46. The spindle of claim 44, wherein said straight portions are positioned about a central point of said circular cross-sectional profile of said first portion.

47. The spindle of claim 44, wherein said straight portions are positioned symmetrically about a central point of said circular cross-sectional profile of said first portion.

48. The spindle of claim 39, wherein said cross sectional profile of said second portion extends outside said cross-sectional profile of said first portion; said cross-sectional profile of said second portion having a generally straight portion.

49. The spindle of claim 48, wherein said cross sectional profile of said third portion extends outside said cross-sectional profile of said first portion; said cross-sectional profile of said second portion having a generally straight portion parallel to said straight portion of said cross-sectional profile of said second portion.

50. The spindle of claim 49, wherein said cross-sectional profile of first portion is generally circular.

51. The spindle of claim 49, wherein said cross-sectional profile of first portion is generally trapezoid.

* * * * *